US007015427B1

(12) United States Patent
Jeter

(10) Patent No.: US 7,015,427 B1
(45) Date of Patent: Mar. 21, 2006

(54) APPARATUS AND METHOD FOR MELTING AND SUPPLYING THERMOPLASTIC MATERIAL TO A DISPENSER

(75) Inventor: David R. Jeter, Woodstock, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/993,039

(22) Filed: Nov. 19, 2004

(51) Int. Cl.
*F27B 14/00* (2006.01)

(52) U.S. Cl. ............ 219/421; 219/424; 219/427; 222/146.5; 222/156; 222/152; 222/189.6; 222/397

(58) Field of Classification Search ............ 219/421, 219/424, 427; 222/189.06, 146.5, 189.01, 222/396–7, 152, 156, 318
See application file for complete search history.

(56) References Cited

U.S. PATENT DOCUMENTS

| | | | |
|---|---|---|---|
| 4,485,942 A | 12/1984 | Petrecca | 222/146.5 |
| 4,771,920 A | 9/1988 | Boccagno et al. | 222/146.5 |
| 5,061,170 A | 10/1991 | Allen et al. | 425/197 |
| 5,662,243 A | 9/1997 | Bondeson et al. | 222/1 |
| 5,680,961 A | 10/1997 | Boccagno et al. | 222/143 |
| 5,680,963 A | 10/1997 | Brusko et al. | 222/146.5 |
| 5,706,982 A | 1/1998 | Siddiqui et al. | 222/146.5 |
| 5,715,972 A | 2/1998 | Siddiqui | 222/146.5 |
| 5,814,790 A | 9/1998 | Bondeson et al. | 222/421 |
| 6,039,217 A * | 3/2000 | Faulkner et al. | 222/146.5 |

* cited by examiner

*Primary Examiner*—Shawntina Fuqua
(74) *Attorney, Agent, or Firm*—Wood, Herron & Evans, L.L.P.

(57) ABSTRACT

An apparatus including a tank having at least one side wall for receiving solid or semi-solid thermoplastic material and a base member supporting the side wall(s) for heating and melting the thermoplastic material. The base member has a heated upper surface sloped downwardly towards the side wall(s) for directing the flow of melted material, and is configured to provide a collection trough for receiving the melted material. A strainer is positioned above the collection trough to filter the melted material. The strainer is adapted to support the remaining solid or partially solidified thermoplastic material above a portion of the heated upper surface to provide a less restricted flow path for the melted material to the collection trough.

32 Claims, 7 Drawing Sheets

APPARATUS AND METHOD FOR MELTING AND SUPPLYING THERMOPLASTIC MATERIAL TO A DISPENSER

FIELD OF THE INVENTION

The present invention relates generally to thermoplastic material melting technology, and more particularly, to an apparatus and method for melting and supplying hot melt adhesives to a dispenser.

BACKGROUND OF THE INVENTION

Hot melt adhesives, such as those used in the manufacturing of disposable diapers, packaging, and other products, are commonly formed from solid or semi-solid pieces of thermoplastic material that are melted prior to use. The thermoplastic material is available in bulk, in such solid forms as chicklets, pellets, pillows, and bricks, etc., and may be converted into a molten state in a tank having side walls and a heated bottom or base section.

The thermoplastic material is typically maintained in a molten state in the tank in sufficient volume to supply one or more applicators or dispensers. If an application requires a substantial volume of hot melt material, a substantially large volume of thermoplastic material must be maintained in a molten state, necessitating a long start up time for the apparatus. This may be especially true when starting a hot melt adhesive supply system that has been shut down overnight. Because the melted material from the prior day's use typically cools and solidifies when the system is shut down, a substantial portion of the tank may be occupied by a solid slug of thermoplastic material at start up. In addition to limiting the total output rate of the hot melt adhesive supply system, the long start up time may also result in prolonged exposure of at least some of the molten material to heat and/or to oxygen, which can cause the thermoplastic material to char, oxidize, or otherwise degrade.

As a result, some manufacturers have found it desirable to provide hot melt adhesive supply systems in which the bottom surface of the tank is sloped downwardly towards a central outlet. One or more heating elements that are cast into the base of the tank heat the bottom surface to a temperature at which the solid thermoplastic material at the bottom of the tank melts and converts to a molten state. Due to the sloped nature of the bottom surface, the newly melted material is able to flow down into the central outlet, allowing the remaining solid thermoplastic material to shift closer to the heated bottom surface. By quickly draining the newly formed liquid adhesive, such an arrangement helps reduce the total amount of thermoplastic material that is maintained in a molten state for prolonged periods of time.

One challenge associated with this type of hot melt adhesive supply system is that the funnel-shaped tank design can occasionally create a "choke point" for the melted material. For example, as the bottom of a slug of adhesive melts during start-up, the rest of the slug drops down in the middle of the tank and may impede the flow of the newly melted material to the central outlet. This may cause an undesirable reduction in material flow rate. Furthermore, current hot melt supply systems do not take maximum advantage of the thermal conductivity of the tank walls. When the cast-in heater is turned on, some of the first material to melt is located around the lower perimeter of the tank interior. The remaining solid material prevents this newly melted material from making its way towards the central outlet. If it were possible to drain this material more quickly, the overall system could be operated more efficiently and at less cost.

Therefore, a need exists for an apparatus for melting thermoplastic material that heats the material in a more productive manner and provides a less restricted flow path for the material to exit the apparatus.

SUMMARY OF THE INVENTION

The present invention provides an apparatus for melting and supplying thermoplastic material to a dispenser at high rates. The apparatus comprises a tank having at least one side wall for receiving and heating thermoplastic material. The side walls may be supported by a heated base member, which heats thermoplastic material to form liquid hot melt adhesive. For example, solid and semi-solid forms of thermoplastic adhesive material may be heated and melted into a molten liquid form. The liquid adhesive may be pumped out of the tank and into a manifold assembly, where it may be split into separate flows and supplied to one or more dispensers.

The base member includes a sloped upper surface for directing the flow of the liquid adhesive towards the side wall(s) and at least one collection trough for receiving the flow of the newly melted material. A strainer can be positioned above the collection trough for filtering the melted material. The strainer is also designed to provide an unobstructed flow path for the liquid adhesive as it flows down the sloped upper surface and into the collection trough. For example, if a solid slug of thermoplastic material is resting on the base member at start up, the bottom and lower perimeter of the slug melts first while the strainer supports the rest of the slug to prevent it from dropping down and blocking the flow path of the liquid adhesive to the collection trough and, ultimately, to the tank outlet.

The strainer of the present invention also allows liquid adhesive near the lower portions of the side walls to drain into the collection trough. Thus, other pieces of solid or semi-solid thermoplastic material can shift closer to the lower perimeter of the tank interior and take advantage of the lower wall portions which heat up fastest. By heating the thermoplastic material in this manner, a higher melt rate and greater throughput of liquid hot melt adhesive may be produced. This leads to higher manufacturing productivity in many instances.

These and other features and advantages of the present invention shall be made apparent from the accompanying drawings and the descriptions thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
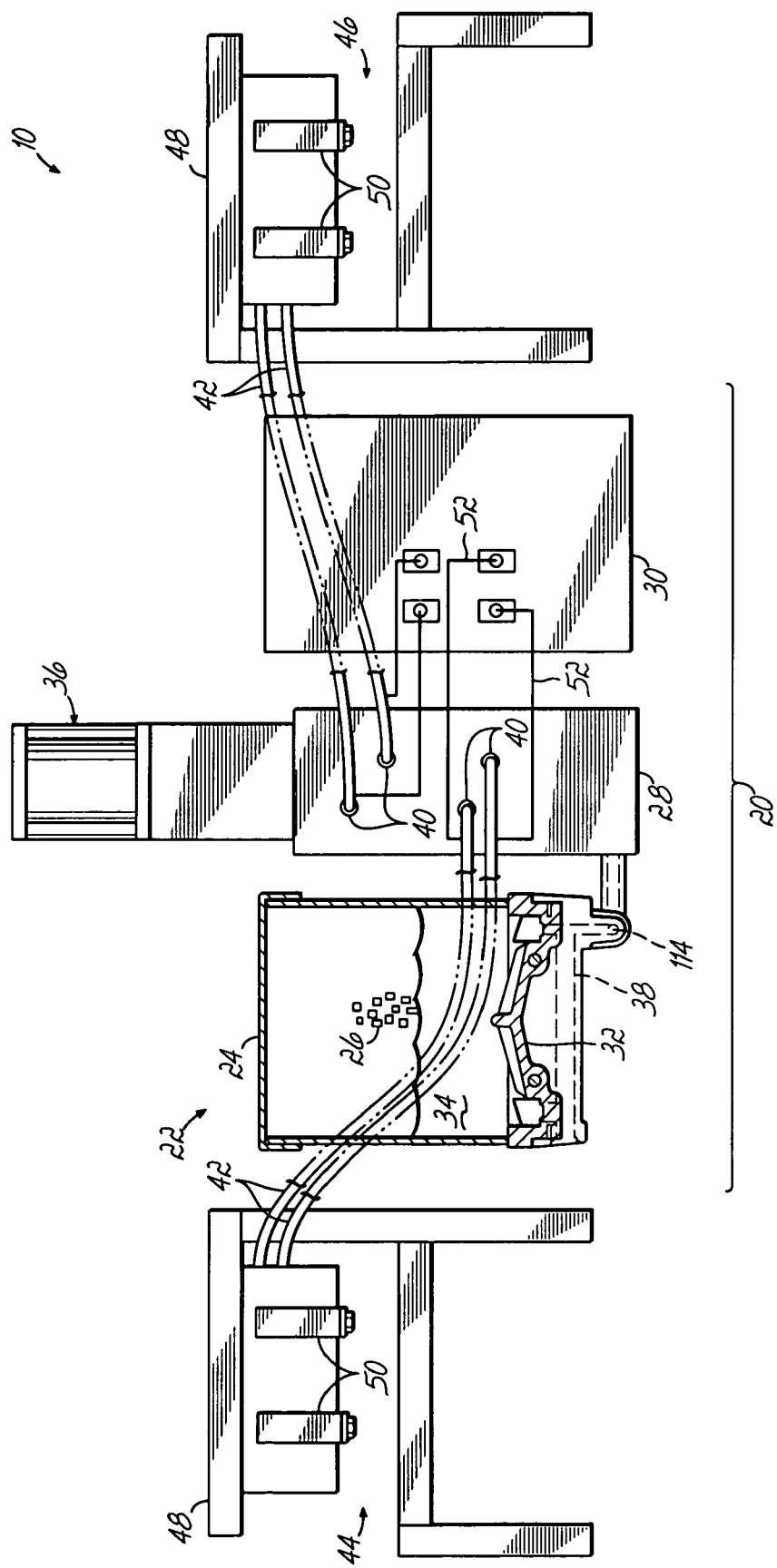
FIG. 1 is a schematic drawing of an exemplary hot melt adhesive system having an apparatus in accordance with a first embodiment of the present invention.

With reference to FIG. 1, an exemplary hot melt adhesive system 10 includes a heating apparatus, and more particularly a melting apparatus 20 constructed according to the principles of the present invention. The apparatus 20 includes a tank 22 with a removable cover or lid 24 for receiving and holding thermoplastic material 26 in solid, semi-solid and liquid forms, a manifold assembly 28 connected to the tank 22, and a control unit 30. The tank 22 includes a base member 32 which melts the thermoplastic material 26 to form molten liquid adhesive 34, as will be discussed in greater detail below. A pump 36 coupled to the manifold assembly 28 pumps the liquid adhesive 34 out of the tank 22, through a fluid passageway 38, and into the manifold assembly 28 where it may be divided into separate flows. The manifold assembly 28 has outlet ports 40, which may be fitted with heated hoses 42 to supply the liquid adhesive 34 to one or more dispensers 44, 46. The dispensers 44, 46 may be mounted to a frame or support bracket 48, and include one or more dispensing modules 50 for applying the liquid adhesive 34 to a desired product (not shown).

The control unit 30 may be located adjacent to the manifold assembly 28. In addition to housing a power supply for the apparatus 20, the control unit 30 monitors and adjusts the heating of the tank 22 and hoses 42 to melt the thermoplastic material 26 received in the tank 22 and maintain the liquid adhesive 34 at a desired temperature and viscosity as it is supplied to the dispensers 44, 46. The heated hoses 42 may be electrically coupled to the control unit 30 by cord sets 52 associated with each hose 42.

Figure 2:
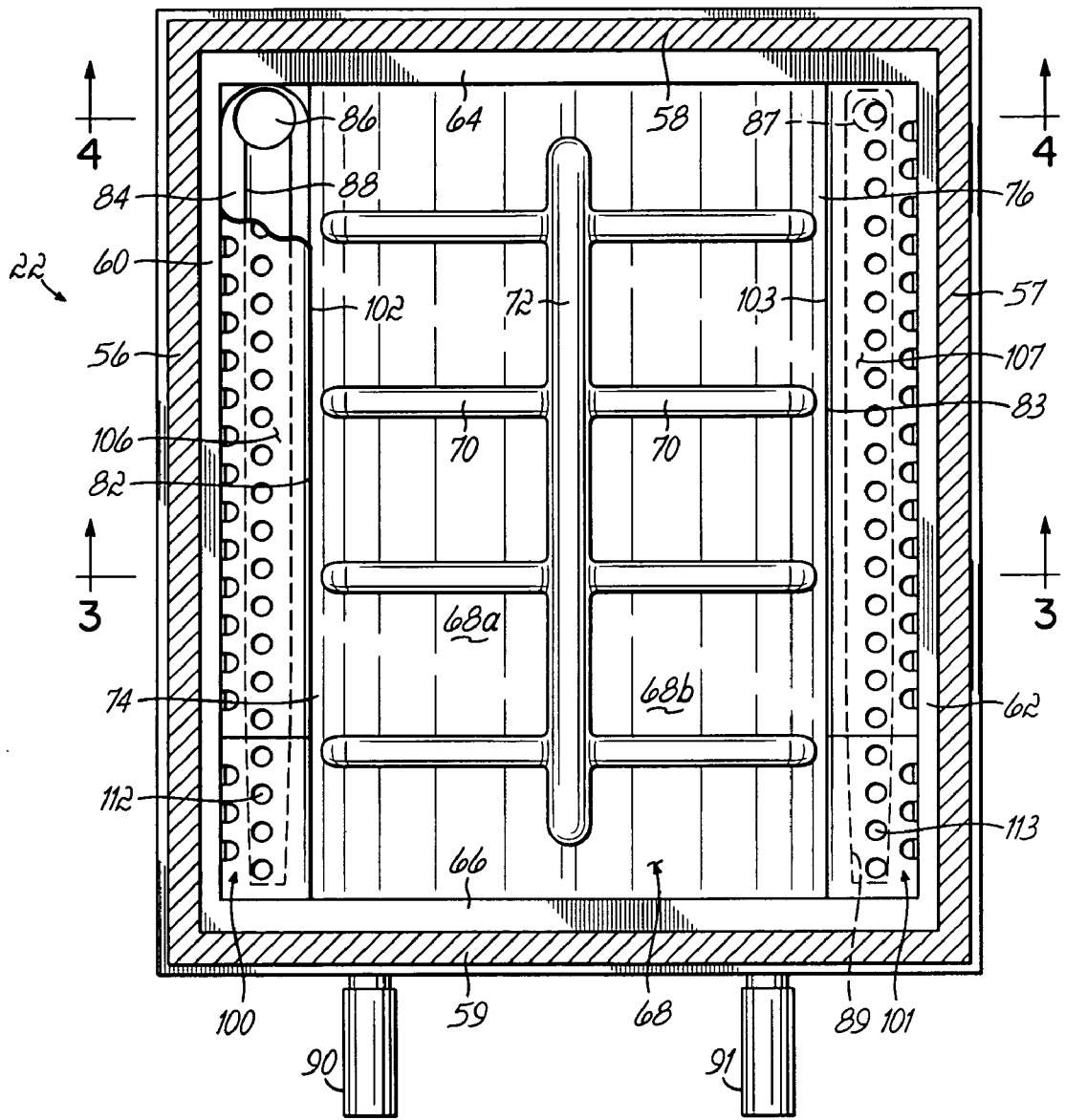
FIG. 2 is a top cross-sectional view of the melting apparatus used in the system of FIG. 1.
Figure 3:
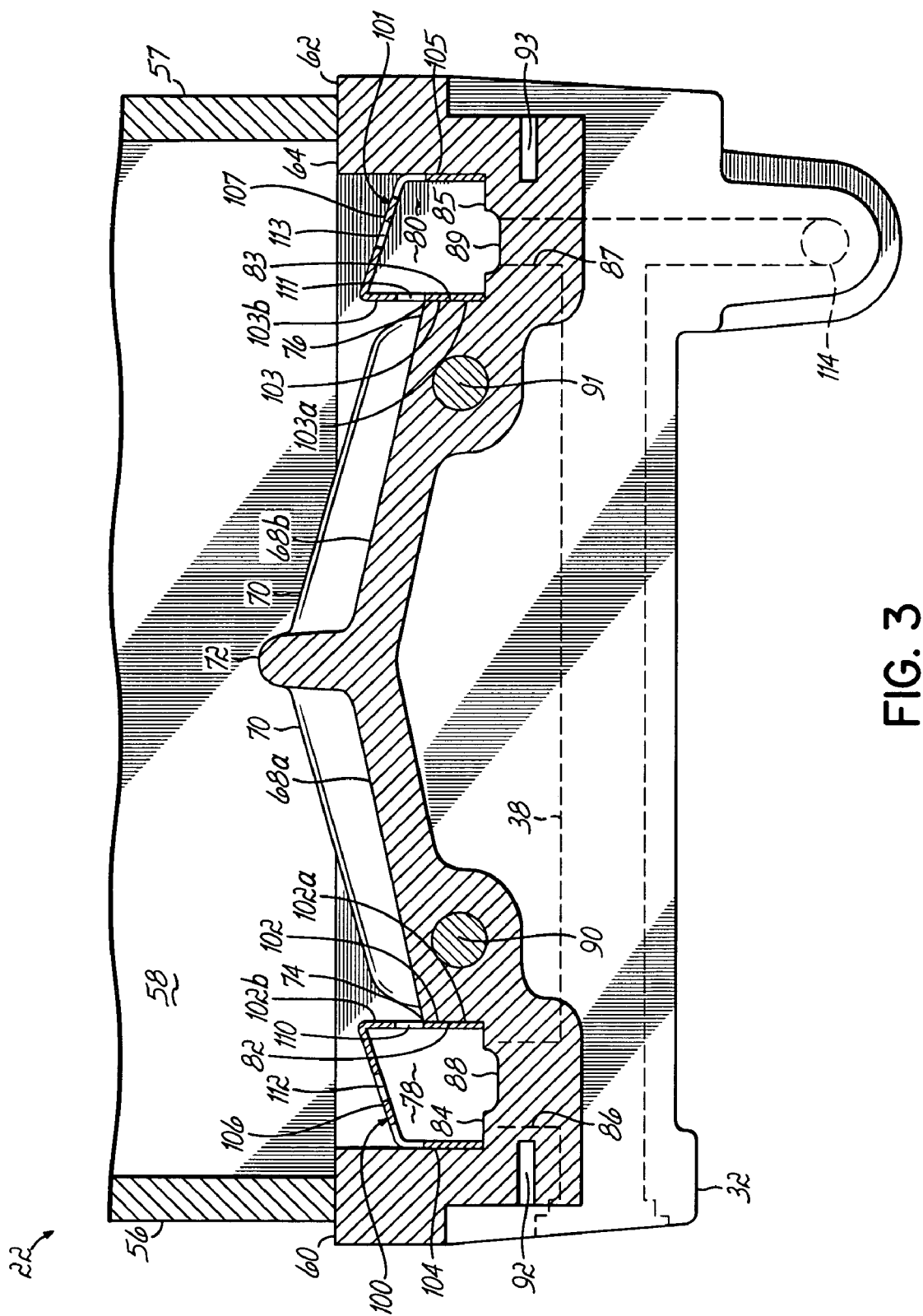
FIG. 3 is a cross-sectional view taken along line 3—3 of FIG. 2.
Figure 4:
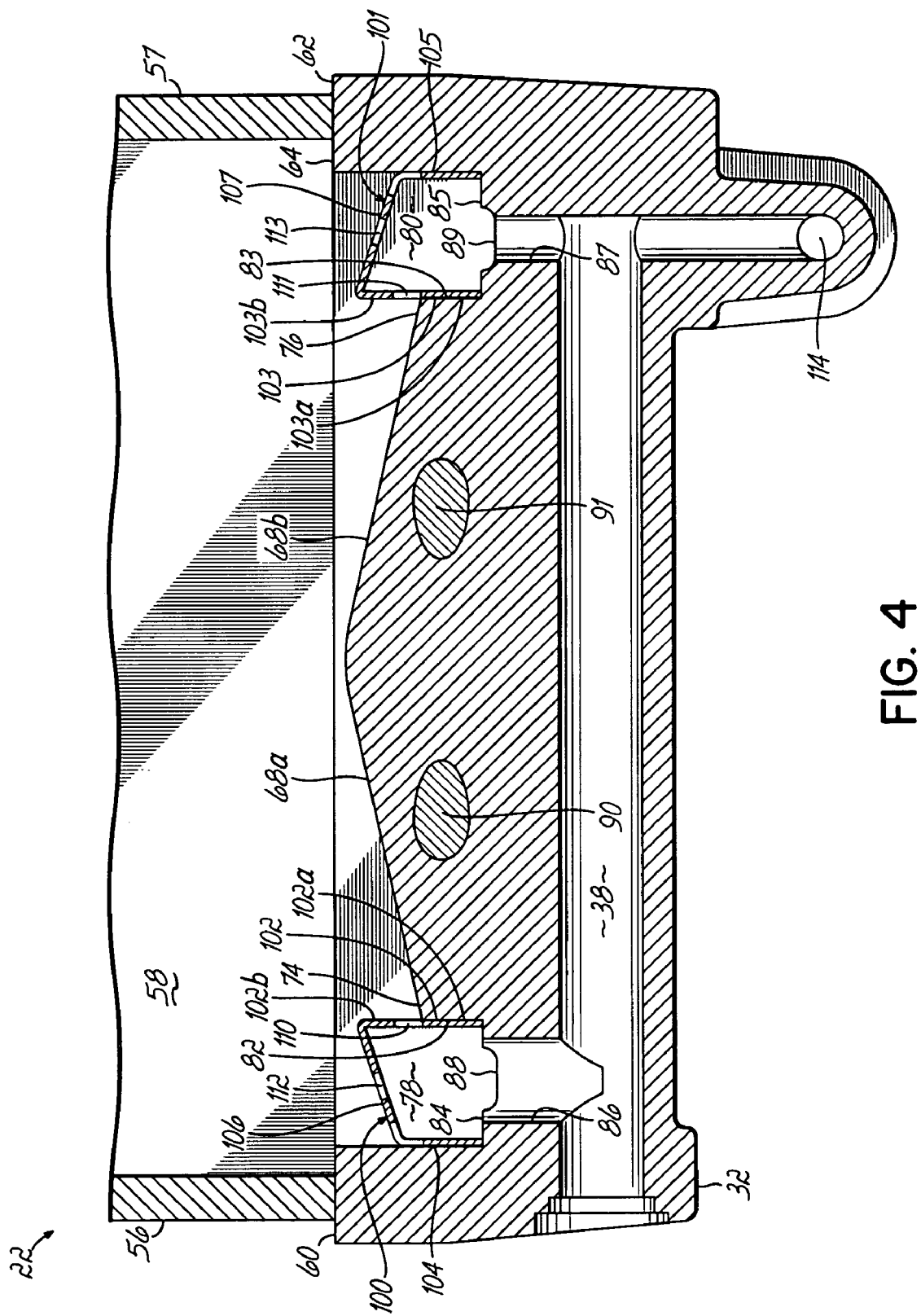
FIG. 4 is a cross-sectional view taken along line 4—4 of FIG. 2.

Referring to FIGS. 2–3, the tank 22 includes a first pair of opposite side walls 56, 57 and second pair of opposite side walls 58, 59 attached to the base member 32. More specifically, the first pair of opposite side walls 56, 57 may be supported by flanges 60, 62 and the second pair of opposite side walls 58, 59 may be supported by flanges 64, 66. The first and second pair of opposite side walls 56, 58 may form a rectangular shaped tank 22, although any other shape is also within the scope of the invention. The base member 32 and side walls 56, 57, 58, 59 are preferably formed from a suitable material, such as aluminum, which has high thermal conductivity. The base member 32 may be cast from aluminum, while the side walls 56, 57, 58, 59 may be formed from an aluminum extrusion and welded onto the flanges 60, 62, 64, 66.

To form a sloped bottom with respect to the interior of the tank 22, the base member 32 includes an upper surface 68 with left and right portions 68a, 68b sloped downwardly from the center of the tank 22, in this first embodiment, towards the flanges 60, 62 and first pair of opposite side walls 56, 57. The left and right portions 68a, 68b of the upper surface 68 are generally rectangular and generally planar, but may include a plurality of fins 70 to maximize the surface area of the upper surface 68. In the embodiment shown in FIGS. 2–5, the fins 70 are arranged symmetrically about a central ridge 72 positioned between the left and right portions 68a, 68b of the upper surface 68. The fins 70 extend down the slopes of the left and right portions 68a, 68b in a direction substantially perpendicular to the ridge 72, and taper in height as they approach edges 74 and 76 of the upper surface 68. The fins 70 also help support a solid or semi-solid slug of thermoplastic material off of surface 68 to prevent such a slug from blocking the flow of molten material.

As shown in FIGS. 2–5, the base member 32 provides a collection trough 78 between the left portion 68a of upper surface 68 and flange 60, and a collection trough 80 between the right portion 68b of upper surface 68 and flange 62. Thus, collection trough 78 extends along the length of edge 74 and collection trough 80 extends along the length of edge 76. Both of the collection troughs 78, 80 may be in the form of a rectangular duct defined by the flanges 60, 62, side walls 82, 83 extending downwardly from the edges 74, 76, and bottom surfaces 84, 85 positioned between the side walls 82, 83 and flanges 60, 62, respectively. The bottom surfaces 84, 85 include respective outlets 86, 87 at ends of the collection troughs 78, 80 that lead to the fluid passageway 38. At least a portion of the bottom surfaces 84, 85 may further include grooves 88, 89 that are sloped downwardly towards the outlets 86, 87. The primary purpose of grooves 88, 89 is to facilitate full drainage of liquid from the tank 22, for example, during a changeover from one type of adhesive to another. The use of outlets 86, 87 having different diameters, as shown, balances the flow of molten material from the troughs 78, 80 to outlet 114 such that a generally equal amount of liquid flow is achieved out of each trough 78, 80.

As shown in FIG. 3, two heating elements 90, 91 are cast into the base member 32. The heating element 90 is positioned below the left portion 68a of the upper surface 68 and closely adjacent to the collection trough 78, while the heating element 91 is positioned below the right portion 68b of the upper surface 68 and closely adjacent to the collection trough 80. An RTD, thermocouple, or other suitable temperature sensing device (not shown) may be provided on either side of the base member 32, inserted into one of two bores 92, 93 provided on each side of the base member 32. In other embodiments, the base member 32 may further include a third heating element (not shown) positioned between the ends of the heating elements 90, 91, creating a U-shaped heating arrangement.

Figure 5:
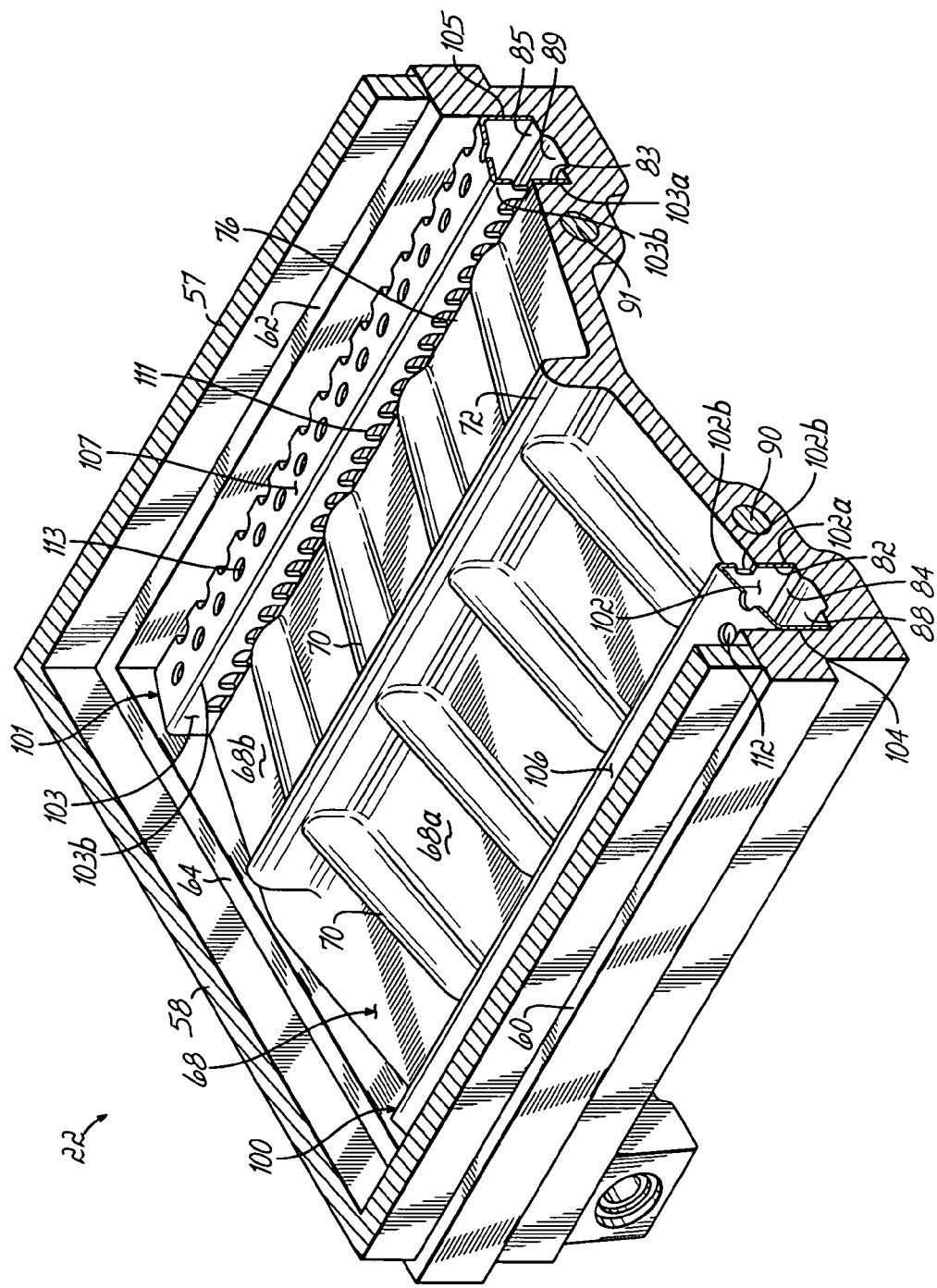
FIG. 5 is a perspective view, partially in cross-section, of the apparatus of FIG. 1.

Referring back to FIGS. 2–5, strainers 100, 101 may be positioned above each of the collection troughs 78, 80. In one embodiment, the strainers 100, 101 respectively include first side surfaces 102, 103 having lower portions 102a, 103a flush with the side walls 82, 83 and upper portions 102b, 103b facing the upper surface 68 of the base member 32, second side surfaces 104, 105 opposite the first side surfaces 102, 103 and flush with the flanges 60, 62, and upper surfaces 106, 107 connecting the first side surfaces 102, 103 to the second side surfaces 104, 105. The first side surfaces 102, 103 are greater in height than the second side surfaces 104, 105 such that the upper surfaces 106, 107 have at least a portion sloped downwardly from the first side surfaces 102, 103 towards the second side surfaces 104, 105. As shown in FIGS. 2 and 5, the strainers 100, 101 further include perforations 110, 111 located on the first side surfaces 102, 103 and perforations 112, 113 located on the upper surfaces 106, 107. The perforations 110, 111, 112, 113 are preferably circular and, as explained more fully hereinafter, enable the strainers 100, 101 to function as filters for the liquid adhesive 34. Although the perforations 112, 113 are shown on the sloped portion of the upper surfaces 106, 107 in FIGS. 2 and 5, the upper surfaces 106, 107 may further include a flat portion (not shown) with the perforations 112, 113 located thereon.

In use, the thermoplastic material 26 may be loaded into the tank 22 in bulk forms, such as chicklets, pellets, pillows, or bricks. In some cases, the tank 22 may already be occupied by a solid or semi-solid slug of thermoplastic material that was melted during prior operation of the apparatus 20, but has since cooled and at least partially solidified to occupy a portion of the tank 22. After activating the heating elements 90, 91, the upper surface 68 of the base member 32 is heated to a temperature at which the thermoplastic material 26 melts and forms molten liquid adhesive 34. Therefore, during use there may be both solid and liquid forms of thermoplastic material in tank 22. The sloped geometry of the left and right portions 68a, 68b of the upper surface 68 causes the newly melted adhesive to flow from the center of the tank 22 towards the first pair of opposite side walls 56, 57. When the liquid adhesive 34 reaches the edges 74, 76 of the upper surface 68, the perforations 110, 111 located on the first side surfaces 102, 103 of the strainers 100, 101 filter out any remaining solid or semi-solid thermoplastic material 26 and allow the liquid adhesive 34 to flow into the collection troughs 78, 80. The strainers 100, 101 also support the remaining solid or semi-solid thermoplastic material 26 above the portions of the base member 32 that are near the edges 74 and 76. In other words, the strainers 100, 101 prevent the solid or semi-solid thermoplastic material 26 from dropping down in front of the perforations 110, 111 and impeding the flow of the newly melted material to the collection troughs 78, 80.

Due to the thermal conductivity of the first pair of opposite side walls 56, 57, activating the heating elements 90, 91 may also cause the thermoplastic material near the lower perimeter of the tank 22 to melt and form liquid adhesive 34. The perforations 112, 113 located on the upper surfaces 106, 107 of the strainers 100, 101 allow this liquid adhesive to drain into the collection troughs 78, 80, where it meets the liquid adhesive flowing from the upper surface 68 of the base member 32. As the different flows gather in the collection troughs 78, 80, the grooves 88, 89 on the bottom surfaces 84, 85 promote movement of the liquid adhesive 34 towards the outlets 86, 87 and into the fluid passageway 38. The fluid passageway 38 then directs the flows from the two collection troughs 78, 80 to a single tank outlet 114, where the liquid adhesive 34 may be pumped to the manifold assembly 28.

By quickly draining the liquid adhesive 34 near the lower portions of the first pair of opposite side walls 56, 57, other pieces of solid or semi-solid thermoplastic material 26 can shift closer to the lower perimeter of the tank interior and take advantage of the heated walls 56, 57. Because the solid and/or semi-solid thermoplastic material 26 is heated in a more productive manner, apparatus 20 can be operated more efficiently and at less cost. The productive heating arrangement, along with the less restricted flow path provided by the strainers 100, 101 also enables apparatus 20 to achieve high melt rates and throughput of liquid adhesive 34.

While the apparatus 20 shown in FIGS. 1–5 includes collection troughs 78, 80 positioned between the base member 32 and first pair of opposite side walls 56, 57, it is also possible to utilize the many advantages of the invention by providing a base member that includes a collection trough extending along its entire perimeter. For example, the base member 32 may be pyramid shaped and further include collection troughs (not shown) positioned between the upper surface 68 and second pair of opposite side walls 58, 59.

Figure 6:
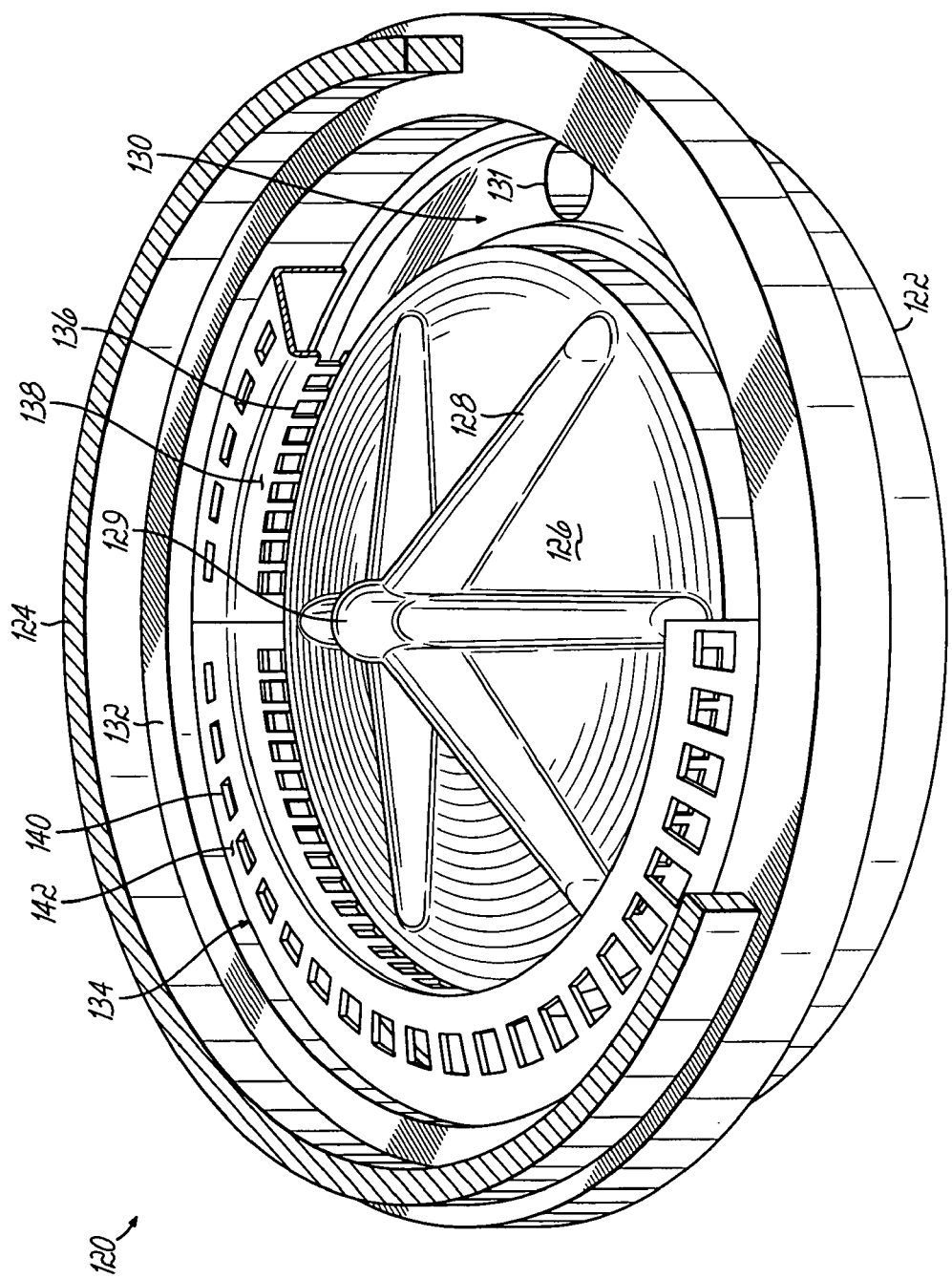
FIG. 6 is a perspective view, partially in cross-section, illustrating a second embodiment of the present invention.

With reference to FIG. 6, the present invention may alternatively provide a tank 120 that has a circular base member 122 and cylindrical wall 124. In such an embodiment, the base member 122 includes a raised upper surface 126. This upper surface 126 may be cone shaped and may have a plurality of fins 128 extending in a radial direction from a central portion 129, a collection trough 130 for receiving melted material from the upper surface 126 and directing the melted material to an outlet 131. A flange 132 may form a wall of the collection trough 130 and may provide support for the cylindrical wall 124. A strainer 134 positioned above the collection trough 130 includes perforations 136 on a side surface 138 and perforations 140 on an upper surface 142. The trough 130 extends partially or fully (as shown) along the perimeter of the base member 122. The tank 120 can heat and melt thermoplastic material in same manner as previously discussed in connection with tank 22. Thus, those having ordinary skill in the art will recognize that the invention may equally apply to other embodiments in which the geometry of the base member directs the flow of the newly melted adhesive from a sloped surface of the tank to a collection trough located near one or more side walls.

Figure 7:
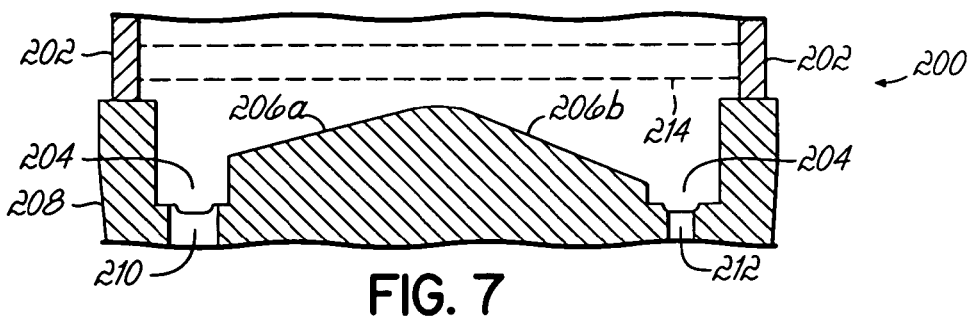
FIG. 7 is a cross-sectional view of a lower tank section of another alternative embodiment.
Figure 8:
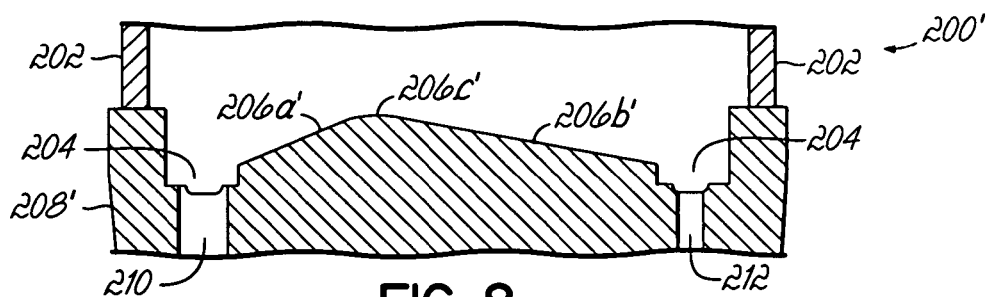
FIG. 8 is a cross-sectional view of a lower tank section of another alternative embodiment.
Figure 9:
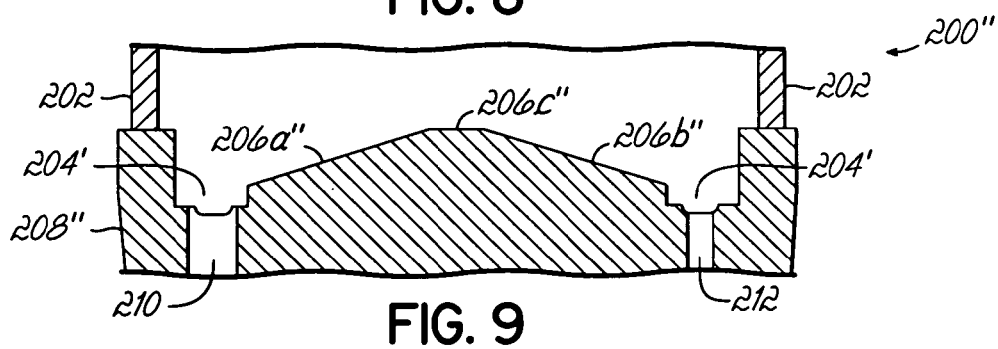
FIG. 9 is a cross-sectional view of a lower tank section of another alternative embodiment.
Figure 9A:
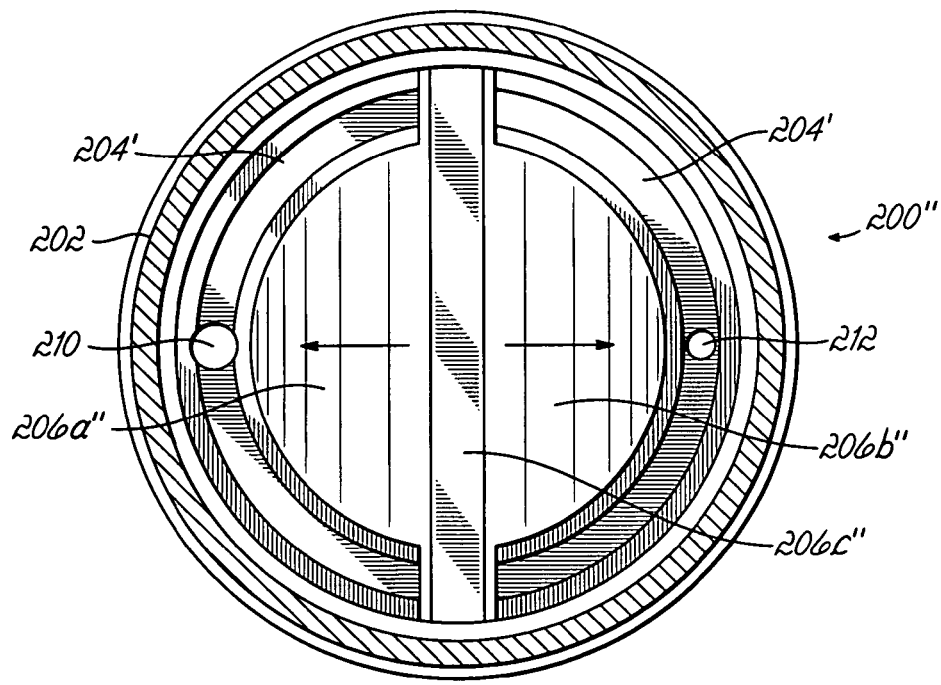
FIG. 9A is a top view of the embodiment shown in FIG. 9.

FIGS. 7–9 and 9A illustrate three additional embodiments of the inventive concepts. Like reference numerals in these figures represent like structure, while like reference numerals with prime marks (') or double prime marks (") represent corresponding elements that have been slightly modified as will be apparent from the description, the figures, or both. FIG. 7 shows the lower portion of a tank 200 having one or more side walls 202 and one or more troughs 204 positioned adjacent to sloped upper surfaces 206a, 206b of a base member 208. Surfaces 206a, 206b may have different slopes, as shown, and extend downwardly away from a raised portion 206c. Respective fluid passageways 210, 212 connect with troughs 204 as in the previously described embodiments for receiving molten thermoplastic material. In this embodiment, the strainers have been eliminated, and a conventional heated melting grid 214 may be optionally supported above surfaces 206a, 206b. The embodiment of FIG. 8 is similar to FIG. 7, except that the highest portion 206c' of the base member 208' is disposed off center between side walls 202. That is, the highest portion 206' is not at the center of the tank 200' but instead is offset to one side. Finally, FIGS. 9 and 9A illustrate a circular tank 200" in cross section and having two troughs 204' separated by a raised portion 206c" and oppositely disposed sloped surfaces 206a", 206b" on either side of the raised portion 206c".

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

Having described the invention, I claim:

1. An apparatus for heating thermoplastic material, comprising:

a tank having at least one side wall defining an interior for receiving the thermoplastic material and a base member having an upper surface sloped downwardly towards said side wall for directing flow of the molten thermoplastic material, at least one collection trough for receiving the molten thermoplastic material from said upper surface, and a fluid passageway for directing the molten thermoplastic material out of said collection trough.

2. The apparatus of claim 1, further comprising:
a strainer positioned above said collection trough, said strainer being adapted to support the thermoplastic material in solid or semi-solid form above a portion of said upper surface and provide a flow path for the molten thermoplastic material to said collection trough.

3. The apparatus of claim 2, wherein said strainer further comprises at least one sloped surface portion, said sloped surface portion having perforations to facilitate flow of the molten thermoplastic material from lower portions of said side wall to said collection trough.

4. The apparatus of claim 2, wherein said strainer further comprises a side surface adjacent to and facing said upper surface of said base member, said side surface having perforations to facilitate flow of the molten thermoplastic material to said collection trough.

5. The apparatus of claim 1, further comprising a pump coupled to said fluid passageway for pumping the molten thermoplastic material from said tank.

6. The apparatus of claim 5, further comprising a manifold assembly communicating with said pump for receiving the molten thermoplastic material from said tank and distributing the molten thermoplastic material to a dispenser.

7. The apparatus of claim 5, wherein said base member includes a plurality of fins on said upper surface.

8. The apparatus of claim 1, wherein said collection trough further comprises a bottom surface having an outlet leading to said fluid passageway.

9. The apparatus of claim 8, wherein a portion of said bottom surface further includes a groove sloped downwardly towards said outlet to promote movement of the molten thermoplastic material to said fluid passageway.

10. The apparatus of claim 1, wherein said base member includes a plurality of channels on said upper surface.

11. The apparatus of claim 1, further comprising:
a heater thermally coupled to at least one of the side wall and the base member.

12. An apparatus for heating thermoplastic material, comprising:
a tank having a first and second pair of opposite side walls defining a tank interior for receiving the thermoplastic material and a base member, said base member having an upper surface with first and second portions sloped downwardly from a raised portion towards said first pair of opposite side walls, first and second collection troughs for receiving the molten thermoplastic material flowing down said first and second portions of said upper surface, and a fluid passageway for directing the molten thermoplastic material out of said first and second collection troughs.

13. The apparatus of claim 12, further comprising:
first and second strainers positioned respectively above said first and second collection troughs, said strainers being adapted to support the thermoplastic material in solid or semi-solid form above a portion of said upper surface and provide a flow path for the molten thermoplastic material to said first and second collection troughs.

14. The apparatus of claim 13, wherein said strainers each further comprise at least one sloped surface portion, said sloped surface portions of said strainers having perforations to facilitate flow of the molten thermoplastic material from lower portions of said first pair of opposite side walls to said first and second collection troughs.

15. The apparatus of claim 13, wherein said strainers each further comprise a side surface adjacent to and facing said upper surface of said base member, said side surfaces having perforations to facilitate flow of the molten thermoplastic material to said first and second collection troughs.

16. The apparatus of claim 12, further comprising a pump coupled to said fluid passageway for pumping the molten thermoplastic material from said tank.

17. The apparatus of claim 16, further comprising a manifold assembly communicating with said pump for receiving the molten thermoplastic material from said tank and distributing the molten thermoplastic material to a dispenser.

18. The apparatus of claim 12, further comprising two heating elements positioned respectively below said first and second portions of said upper surface and closely adjacent to said first and second collection troughs.

19. The apparatus of claim 12, wherein said base member includes a plurality of fins on said first and second portions of said upper surface to maximize the surface area in contact with the thermoplastic material.

20. The apparatus of claim 12, wherein each of said first and second collection troughs further comprises a bottom surface having an outlet leading to said fluid passageway.

21. The apparatus of claim 20, wherein a portion of said bottom surface further includes a groove sloped downwardly towards said outlet to promote movement of the molten thermoplastic material to said fluid passageway.

22. An apparatus for heating thermoplastic material, comprising:
a tank having a base member, said base member having first and second surfaces adjacent to and extending downwardly from one another, first and second oppositely disposed collection troughs, said first collection trough coupled to said first surface and said second collection trough coupled to said second surface, and a fluid passageway communicating with said first and second collection troughs for directing molten thermoplastic material out of said first and second collection troughs.

23. The apparatus of claim 22, wherein the highest point between said first and second surfaces is centered between said collection troughs.

24. The apparatus of claim 22, wherein the highest point between said first and second surfaces is located off center between said collection troughs.

25. The apparatus of claim 22, further comprising a melting grid positioned above said first and second surfaces.

26. The apparatus of claim 22, wherein said first and second surfaces have different slopes.

27. A method of heating and supplying thermoplastic material, comprising:
placing the thermoplastic material in a tank having at least one side wall and a base member, the base member having an upper surface sloped downwardly towards the side wall;
heating the upper surface of the base member to melt the thermoplastic material at the bottom of the tank and promote downward movement of the molten thermoplastic material towards the side wall;

supporting at least partially solidified thermoplastic material above a portion of the upper surface of the base member to provide a flow path for the molten thermoplastic material;

collecting the molten thermoplastic material in a collection trough positioned adjacent the side wall; and directing the molten thermoplastic material from the collection trough through a fluid passageway.

28. The method of claim 27, further comprising:

filtering the molten thermoplastic material through a strainer as it flows off the upper surface of the base member and into the collection trough.

29. The method of claim 28, wherein the strainer includes a top surface and the filtering step further comprises filtering the molten thermoplastic material near the lower portions of the side wall through the top surface of the strainer.

30. The method of claim 28, wherein the strainer includes a side surface and the filtering step further comprises filtering the molten thermoplastic material through the side surface as the molten thermoplastic material flows off the upper surface of the base member.

31. The method of claim 27, further comprising the step of:

pumping the molten thermoplastic material out of the fluid passageway and into a manifold assembly for distribution to a dispenser.

32. The method of claim 27, wherein said heating step further comprises heating the side wall to melt the thermoplastic material near the lower portions of the side wall.

* * * * *